Aug. 7, 1956 J. L. BOWMAN 2,757,593

DISK HILLER MOUNT FOR CULTIVATORS

Filed June 21, 1952 2 Sheets-Sheet 1

INVENTOR.
JAMES L. BOWMAN
BY
ATTORNEY

DISK HILLER MOUNT FOR CULTIVATORS
Filed June 21, 1952 2 Sheets-Sheet 2
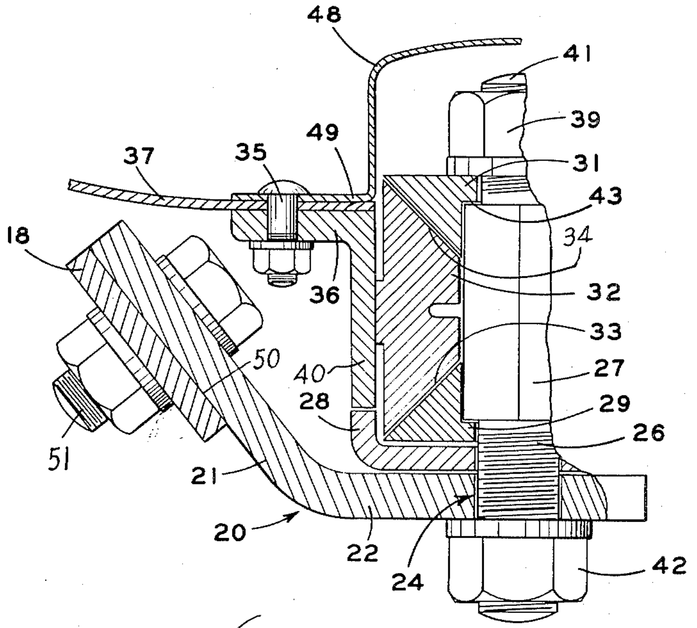
FIG. 2
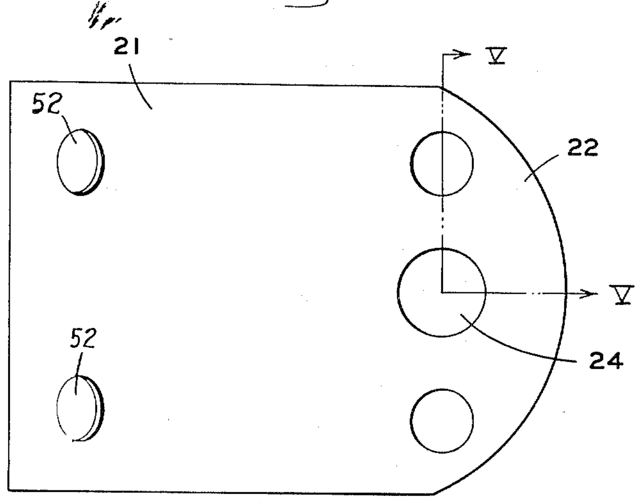
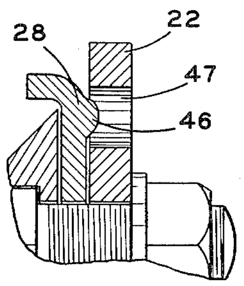
FIG. 5
FIG. 3
INVENTOR.
JAMES L. BOWMAN
BY
[signature]
ATTORNEY United States Patent Office 2,757,593

Patented Aug. 7, 1956

2,757,593

DISK HILLER MOUNT FOR CULTIVATORS

James L. Bowman, Detroit, Mich.

Application June 21, 1952, Serial No. 294,817

2 Claims. (Cl. 97—54)

This invention relates to a mounting device for a disk unit in a disk cultivator, and particularly to a type thereof which will enable disks to be quickly and accurately fastened onto any standard mounting for spring or shank-type cultivator teeth.

In the mounting of disk units onto cultivator frames, it has in the past been customary to provide a mounting axle for the disk which axle extended beyond the bearing as a rod which then was suitably bent to extend beyond the periphery of the disk and to be received into a suitable clamp on the cultivator frame. Somewhat similar rods are used for the support of spring and shank-type teeth and the changing of a cultivator from spring teeth, for example, to disks, required the removal of one set of rods and the teeth attached thereto and the replacement thereof by the rods carrying the disks.

Alternatively, other disk constructions provided a bracket to which was mounted the disk supporting shaft on which was carried the bearing for said disk, and said bracket was bent to provide the correct angular position for the disk. Said bracket frequently terminated in a rod held to said cultivator frame in the manner above set forth.

Because of the angle through which the disk supporting rod, or bracket, was necessarily bent to give the disk the proper angular position with respect to the cultivator frame, there were necessarily different units used for righthand or lefthand placement of the cultivator disks. Thus, the disk units were necessarily sold in sets and often the customer was required to buy more disk units than he would actually expect to use, in order to have the proper ones available as needed. This was obviously a source of annoyance and expense and, further, required storage facilities for the disk units not in use at a given time.

Further, the material required to construct the conventional brackets, or rod and bracket arrangements, was important inasmuch as the mounting rod in each case had to extend beyond the periphery of the disk. It involved considerable duplication inasmuch as the rod portion of the mounting bracket was a substantial duplication of the rod onto which spring and shank teeth were fastened.

Accordingly, there has existed for a great many years a need for simplified mounting bracket for a cultivator disk, which mounting bracket would permit the alternative mounting of any disk as either a righthand or lefthand unit and which bracket would require substantially less material to fabricate than brackets in conventional use.

Accordingly, a principal object of the invention has been to provide a mounting bracket for cultivator disks of great simplicity and yet which will permit the mounting of such disk firmly and reliably in position.

A further object of this invention is to provide a disk, as aforesaid, in which any given cultivator disk unit can be mounted as either a righthand or lefthand unit.

A further object of the invention is to provide a mounting bracket, as aforesaid, requiring substantially less material to fabricate than formerly.

A further object of this invention has been to provide a bracket, as aforesaid, which would be of sufficiently simple structure that the cost of fabrication thereof would be very small.

A further object of the invention has been to provide a bracket, as aforesaid, which would be simple to install and equally simple to remove by ordinary hand tools and without the necessity of special training or instructions to the customer.

Other and related objects and purposes of the invention will become apparent to persons acquainted with apparatus of this general type upon a reading of the following specification and inspection of the accompanying drawings.

In the drawings:

Figure 2 is a fragmentary top, partially in central section, view, taken along the line II—II of Figure 1, of a cultivator disk unit mounted onto the bracket of the invention.

Figure 3 is a view of the bracket of the invention alone and viewed from above in the position shown in Figure 2.

Figure 5 is a sectional view, taken along the line V—V of Figure 3, of the cultivator disk unit mounted onto the bracket of the invention.

*General description*

The bracket of the invention is a simple angular piece of heavy material, preferably cold worked steel, having two flanges positioned to form an angle of about 120 degrees with respect to each other. It is affixed by one of its flanges to the disk bearing in a presently known manner and it is affixed by its other flange to the lower end of the standard mount provided for the spring or shank teeth with which the cultivator is otherwise normally provided.

*Detailed description*

Figure 1:
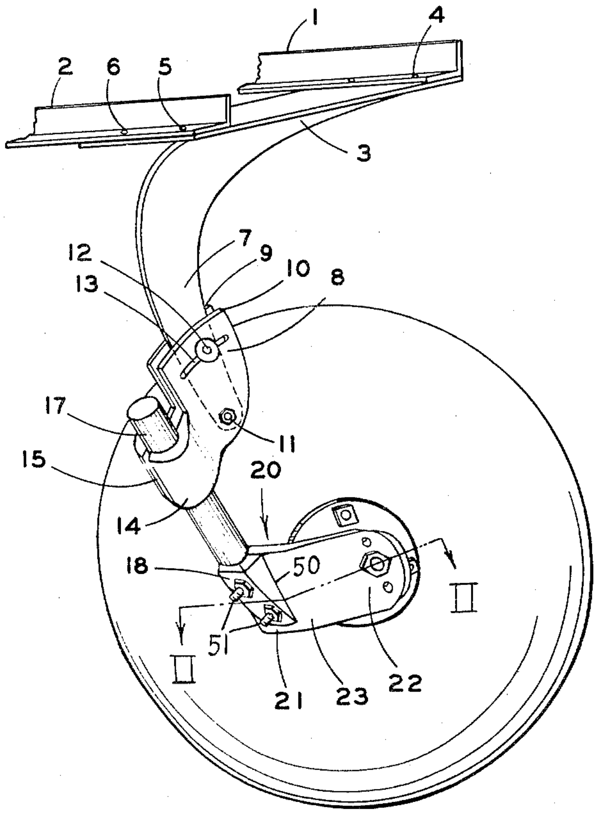
Figure 1 is an oblique fragmentary view of a cultivator equipped with a bracket of this invention.
Figure 4:
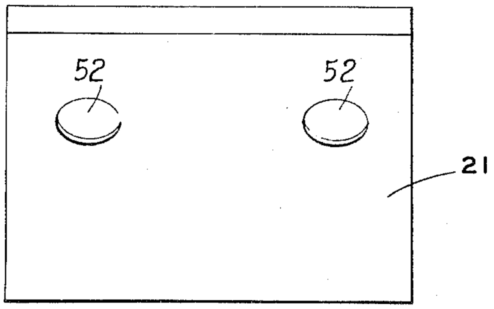
Figure 4 is a view of the bracket of the invention alone and viewed from the left in the position shown in Figure 2.

Referring first to Figure 1 there is shown a pair of horizontal, transversely arranged, frame members 1 and 2. Arranged in a direction parallel to the direction of travel of the cultivator are a series of teeth holding arms of which one is shown at 3. These arms are affixed in any conventional manner by the bolts 4, 5 and 6 to the transverse frame members 1 and 2. The depending end 7 of the arm 3 carries a fixture 8 of any conventional form. As shown here, it has a pair of cooperating sides 9 and 10 which are pivotally fastened by a bolt 11 to the lower extremity of the depending arm end 7 and affixed in a selected position with respect to said arm by the bolt 12 acting through the slots 13. Said fixture 8 has a pair of rod grasping members 14 and 15 of conventional form.

The rod 17 is grasped between the members 14 and 15 in a conventional manner and carries at its lower portion a tooth engaging part 18 which is suitably flattened, as at 50, for receiving a spring or spike tooth, or holding bracket therefor.

All of the foregoing described parts are conventional and are presented for illustration only and will be varied widely as the bracket to be described hereinafter is applied to various types of conventional constructions.

The bracket of the invention is shown at 20. This bracket has a mounting portion 21 and a disk supporting part 22, which portions are connected by a smoothly rounded connection part 23. The mounting portion 21 and the disk supporting part 22 are placed at an angle of approximately 120 degrees with respect to each other, although this will vary a little in either direction as said bracket is designed for use with different types of cultivators. The mounting portion 21 is fastened to the part 18 by bolts 51, which pass through openings 52 formed in the mounting portion 21.

The axle 26 extends through the opening 24 of the mounting portion 22, and has an enlarged non-circular, as rectangular, portion 27 intermediate its ends. A housing flange 28 surrounds said shaft 26 adjacent the portion 22 and its radius is substantially equal to the required radius of the disk hub. Adjustable thrust bearing elements 29 and 31 are mounted on said axle and cooperate with the enlarged non-circular portion 27 to prevent rotation thereof with respect to said axle. A bearing member 32 having conical, oppositely positioned, faces 33 and 34 cooperating with the opposed similar faces of the bearings 29 and 31 is received between said bearing members 29 and 31 as shown. The disk hub 40 is supported by the bearing member 32 and it carries a flange 36 to which is bolted the disk 37. A nut 39 on the threaded end 41 of the axle pulls against the nut 42 on the threaded other end of said axle for holding the assembly together and for holding the bearing members 29 and 31 with the desired amount of pressure against the hub supporting bearing member 32. Sufficient space is provided at 43 in the bearing member 31 to permit a substantial amount of tightening of the bearings to compensate for wear.

Referring to Figure 5 there is shown a small projection 46 on the flange 28 which projection is received into an opening 47 in the part 22 by which relative rotation between said flange 28 and said part 22 is prevented.

A dust cap 48 is provided for covering the end of the axle 26 adjacent the nut 39 and said dust cap is conveniently provided with a flange 49 by which it is held in position under the bolts 35 by which the disk 37 is fastened to the flange 36.

It will be appreciated that the entire assembly of the bracket 20, the axle 26, the disk 37 and the parts mounting same with respect to each other can all be assembled as a pre-assembled unit and may then be fastened and unfastened bodily to and from the tooth engaging part 18 of the rod 17. Thus, a particular implement may quickly be converted from a tooth carrying cultivator into a disk hiller, or the converse, quickly and without the necessity of changing the rod 17 or moving the brackets by which said rod is held. Further, the disks of a given hiller may quickly be changed from right to left hand arrangement, and conversely, without the necessity of changing disks or changing the supporting rod 17 and the parts in turn supporting it.

Thus, I have accomplished the purposes enumerated foregoing.

I claim:

1. In combination with a cultivator construction including a downwardly extending tooth supporting member having a flattened portion at the lower end thereof and a plurality of spaced bolt openings therethrough; a disk unit including a blade, a hub supporting said blade and first bearing means providing a pair of oppositely facing conical bearing surfaces within said hub; an axle having a non-circular enlarged portion intermediate its ends and being threaded at each extremity thereof; second and third bearing members on said axle at each extremity thereof, said second and third bearing members having faces each cooperating with the respectively opposed conical faces of said first bearing means and each of said second and third bearing members having non-circular openings embracing the non-circular portion of said axle for holding said second and third bearing members in non-rotative relationship with respect to said axle; a bracket having a planar disk unit supporting portion positioned on said axle substantially perpendicular to the axis of said axle and on the side of said bearing members remote from said disk unit and having a substantially planar mounting portion positioned directly on and at such an angle with respect to said disk unit supporting portion that said mounting portion lies axially between said disk unit and the nearest surface of said disk unit supporting portion, said mounting portion having mounting openings therein corresponding to the openings in said flattened portion of said tooth supporting member, removable means at each end of said axle holding said parts in selected position on said axle and imposing a preselected amount of pressure between said conical bearing faces, said mounting openings having their centers on a line which is substantially perpendicular to a line extending from a point mid-way between said openings to the axis of said axle.

2. In combination with a cultivator construction including a downwardly extending tooth supporting member having a tool engaging portion at the lower end thereof: a disk unit including a blade, a hub supporting said blade and first bearing means providing a pair of oppositely facing conical bearing surfaces within said hub; an axle having a non-circular enlarged portion intermediate its ends and being threaded at each extremity thereof; second and third bearing members having faces, each cooperating with the respectively opposed conical faces of said first bearing means, and each of said second and third bearing members having non-circular openings embracing the non-circular portion of said axle for holding said second and third bearing members in non-rotative relationship with respect to said axle; a bracket having a disk unit supporting portion positioned on said axle on the side of said bearing members remote from said disk unit, and having a mounting portion positioned directly on and at such an angle with respect to said disk unit supporting portion that said mounting portion lies axially between said disk unit and the nearest surface of said disk unit supporting portion, said mounting portion having mounting means removably attached to said tool engaging portion of said tooth supporting member, removable means at each end of said axle holding said parts in selected position on said axle and imposing a preselected amount of pressure between said conical bearing faces, the axis of said mounting means lying at substantially right angles with respect to the longitudinal axis of said bracket.

References Cited in the file of this patent

UNITED STATES PATENTS

| | | |
|---|---|---|
| 716,190 | Christman | Dec. 16, 1902 |
| 803,047 | Browne | Oct. 31, 1905 |
| 866,007 | Dodson | Sept. 17, 1907 |
| 908,383 | Biss | Dec. 29, 1908 |
| 941,191 | Ditmar | Nov. 23, 1909 |
| 1,045,137 | Gardiner | Nov. 26, 1912 |
| 1,888,618 | Burch | Nov. 22, 1932 |
| 2,204,490 | Harris | June 11, 1940 |